United States Patent [19]

Figini

[11] 4,189,780
[45] Feb. 19, 1980

[54] ELECTRONIC COMPUTER WITH AUTOMATIC DECIMAL POINT SETTING MEANS

[75] Inventor: Mario Figini, Bosco Marengo, Italy

[73] Assignee: Ing. C. Olivetti & C., S.p.A., Ivrea, Italy

[21] Appl. No.: 919,953

[22] Filed: Jun. 28, 1978

Related U.S. Application Data

[63] Continuation of Ser. No. 715,126, Aug. 17, 1976, abandoned.

[30] Foreign Application Priority Data

Aug. 25, 1975 [IT]  Italy ................. 69127 A/75

[51] Int. Cl.² .......................................... G06F 7/38
[52] U.S. Cl. .................................................. 364/744
[58] Field of Search .................... 364/744; 235/61 DP

[56] References Cited

U.S. PATENT DOCUMENTS

| 3,405,392 | 10/1968 | Milne et al. | 364/744 X |
| 3,546,676 | 12/1970 | Ragen | 364/200 |
| 3,588,841 | 6/1971 | Ragen | 364/200 |
| 3,634,666 | 1/1972 | Ragen | 364/744 |
| 3,657,529 | 9/1972 | Hamano | 364/744 |
| 3,921,925 | 7/1976 | Wenninger et al. | 364/709 X |

*Primary Examiner*—David H. Malzahn
*Attorney, Agent, or Firm*—Schuyler, Birch, McKie & Beckett

[57] ABSTRACT

In an electronic computer a device for selecting the number of decimal digits to be printed in the results is adapted to cause the automatic setting of the decimal point in each result to be printed. Inhibition of this automatic setting is obtained by depressing the conventional decimal point key on the computer keyboard. The computer is of the microprogrammed type and includes a read-only memory storing micro-programs for detecting and testing the position of the selecting device.

13 Claims, 11 Drawing Figures

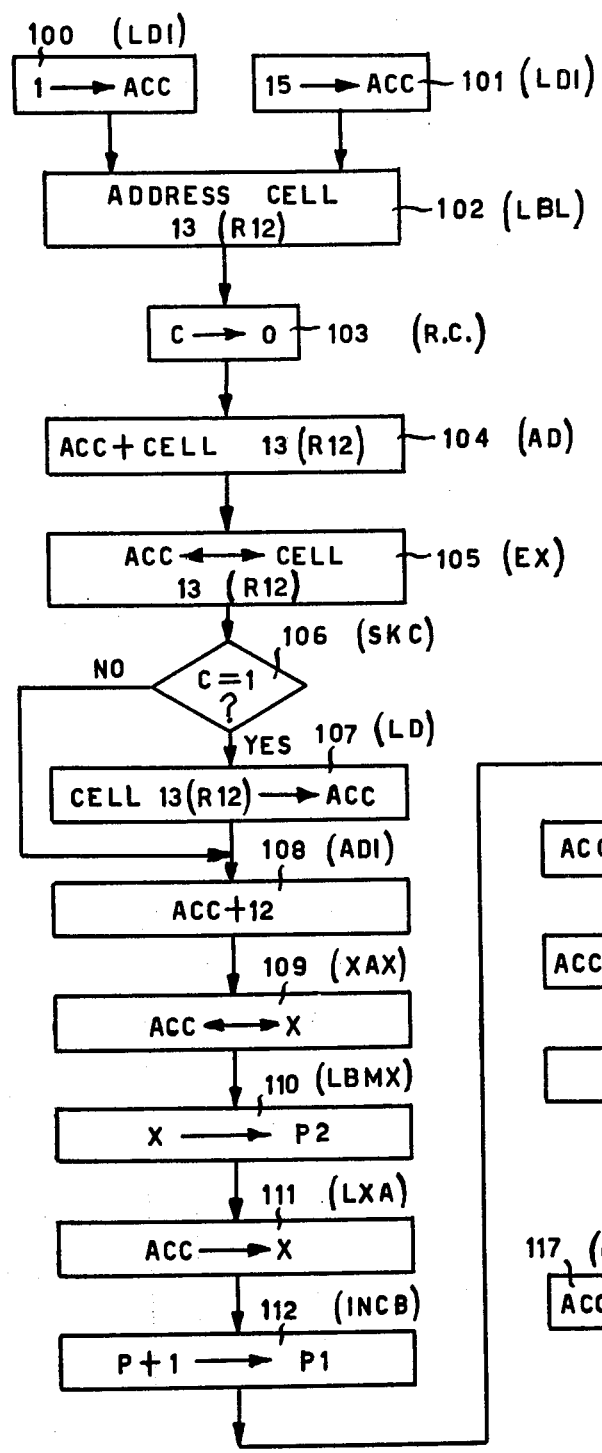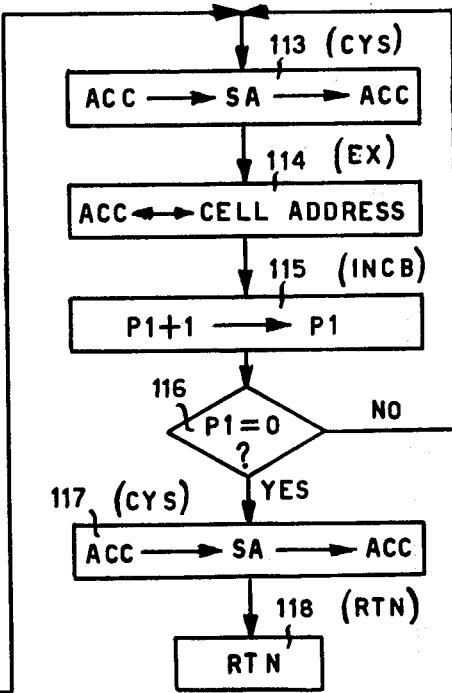
FIG. 8

ELECTRONIC COMPUTER WITH AUTOMATIC DECIMAL POINT SETTING MEANS

This is a continuation of application Ser. No. 715,126, filed Aug. 17, 1976 now abandoned.

BACKGROUND OF THE INVENTION

The present invention relates to an electronic computer which may be a simple computer of the type commonly referred to as an electronic calculator or part of an accounting machine, for example.

DESCRIPTION OF THE PRIOR ART

Electronic computers are known which can be prearranged for the repeated execution of operations on decimal numbers with a fixed number of decimal digits, such as, for example, numbers representing linear measurements (expressed in meters and millimeters) or monetary values (expressed in say marks and pfennigs, or dollars and cents, or pounds and pence), without the need to enter the decimal point every time. In particular, computers are known which have a selector element for the decimals to be printed (of slider, lever or knob type) for automatically selecting the number of digits of the result, irrespective of those resulting from the computation, and for discarding the surplus decimal digits.

In one of these computers there is provided an additional element for establishing a machine mode such that the numbers introduced on the keyboard as whole numbers are immediately shown on a display or printer, with the point in the fixed position, defined by the decimals selector. These numbers are then processed by the machine, which gives the result also with the decimal point in the fixed position. This mode is advantageous especially in additions and subtractions of long series of numbers with decimals, in as much as the operator avoids entering the point a large number of times, thus achieving a higher speed of data introduction and reducing the waiting times of the machine. For their prearrangement, however, these computers require two separate operations, one for defining the number of desired decimals and the other for defining the mode of the machine for avoiding introduction of the point.

In view of the fact that the additions and subtractions, in which this state is particularly advantageous, are generally effected on dimensions having a fixed number of decimals (millimeters, hundredths, etc.), the need for the two operations may prove detrimental, since the operator may easily forget that the decimals selector is in the wrong position.

Another difficulty arises in the known computers when the machine state must be interrupted temporarily for calculations of values of a type different from the previous ones (for example, whole numbers or decimals with more than two or three decimal digits). In this case, in fact, the operator is obliged to act first on the decimals selector element to position himself at the decimals value which is necessary for the particular calculations to be made and then bring the selector element back to the original state. This operation causes the operator to lose in this way the time which he had saved until then by avoiding pressing the point key. In addition to being a hindrance to the speed of key operation, this method of procedure is troublesome and subject to errors on the part of the operator.

SUMMARY OF THE INVENTION

According to the present invention, there is provided an electronic computer comprising a central processing unit, a numeric keyboard for the entry in the central unit of the data to be processed, a decimal point key for defining the whole part and the decimal part of each datum, an output device for the results processed by the central unit, a selector device for the number of decimals with which the output device presents the result, the selector device comprising an element movable selectively over a series of positions corresponding to the number of decimals to be selected for presentation by the output device, and wherein the movable element has an additional position in which it selects a predetermined number of decimals for the result, and a control device for additions which is operable when the movable element is in the additional position to enter the decimal point automatically independently of the decimal point key in the position corresponding to the number of decimals selected for the result.

BRIEF DESCRIPTION OF THE DRAWINGS

The invention will be described in more detail, by way of example, with reference to the accompanying drawings, in which:

FIGS. 6 to 11 are a series of flow diagrams relating to various operations of the computer.

DESCRIPTION OF THE PREFERRED EMBODIMENT

Introduction

Figure 1:
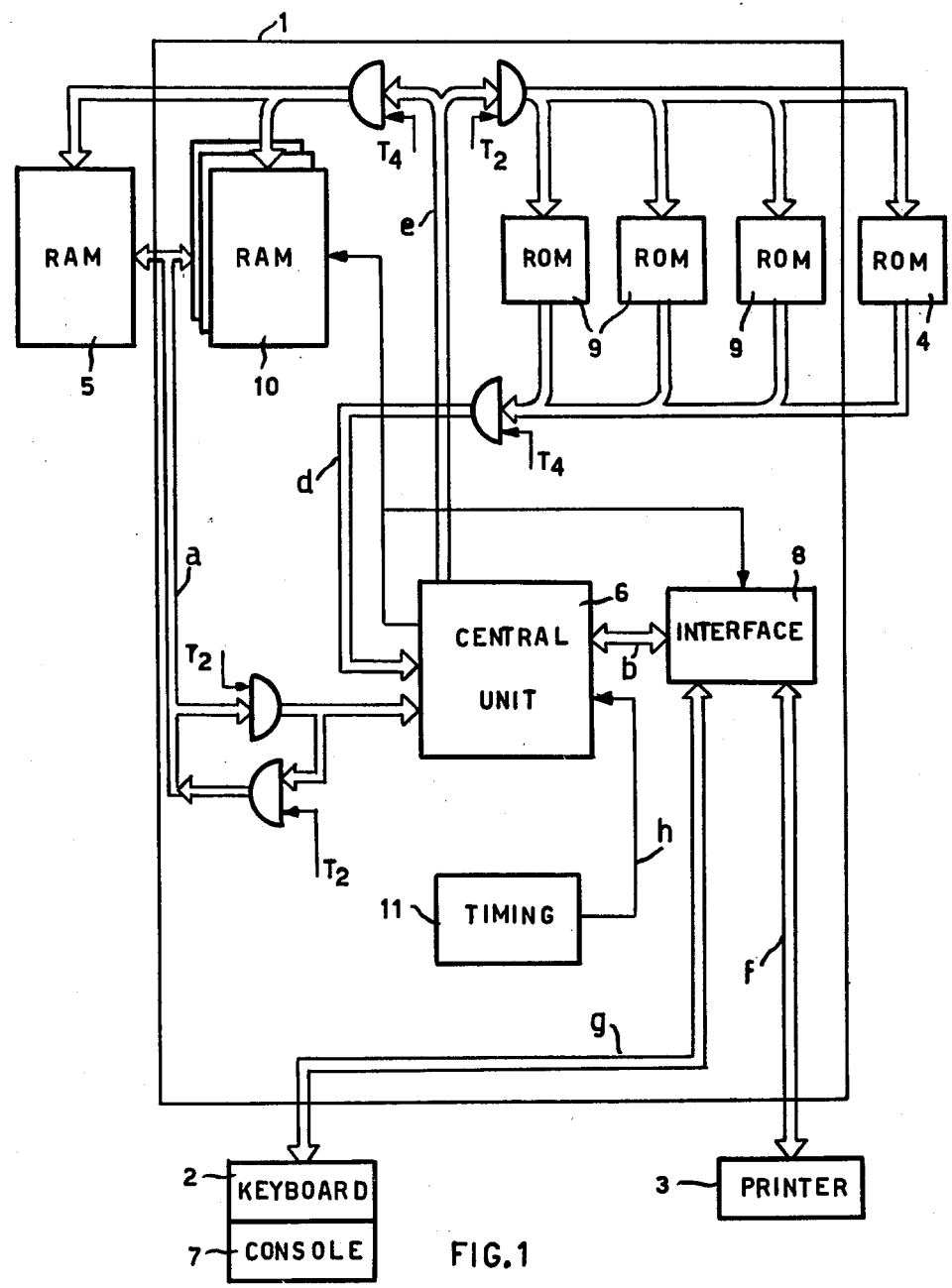
FIG. 1 is a block diagram of the computer embodying the invention.

FIG. 1 shows diagrammatically an electronic computer which comprises a basic processing unit 1, a data and instruction input unit, more particularly a keyboard 2, and a data and instruction symbol output unit, more particularly a printer 3. Associated with the keyboard 2 is a console 7 which comprises controls for a series of auxiliary commands, as will be seen better hereinafter. The computer moreover comprises an external read-only memory (ROM) 4 for microprograms and an external read/write memory (RAM) 5 for data, constants or partial results. Both the memories 4 and 5 are removable and can be connected to the basic unit 1 by the user.

The keyboard 2 and the printer 3 are adapted to exchange data and instructions with the basic unit 1 via the connections f and g, respectively, which are constructed for transmitting an information byte in parallel.

The basic processing unit 1 comprises a central unit 6 capable of processing data introduced from the keyboard 2. The basic unit 1 moreover comprises one or more ROMs 9 of known type, more particularly three ROMs 9 in FIG. 1, each of which can contain 1024 microinstructions which can be executed in response to the depression of function keys of the keyboard 2 to control the unit 6 in the processing of the data.

The basic unit 1 also comprises a memory RAM 10 constituted by 16 modules, each adapted to permit writing and reading in 256 byte locations, for data, constants or intermediate results. A timing circuit 11, constituted basically by an ordinary stabilized oscillator, with logic circuits not shown in FIG. 1, times the operations of the unit 1. Finally, an input/output interface 8 receives the signals originating from the keyboard 2 and from the printer 3 to bring them to the amplitude and waveform required by the processing circuits.

The central unit 6 (FIG. 2) comprises a register 20 for input and output of data to and from the central unit 6 and the memories 5 and 10 via a parallel connection a. The register 20 is connected to a four-bit accumulator 21 which, together with an adder 22, also of four-bit type, forms the arithmetic unit of the computer. The central unit 6 moreover comprises a microinstruction register 23 connected to a microinstruction decoder 24 connected in turn to a ROM addressing register 26. The microinstruction register 23 receives its input from one of the ROMS 9 or 4 by way of a parallel connection d.

The accumulator 21 and the adder 22 are moreover connected to a register 25 for the input and output of data from and to the peripherals, via a parallel connection b to the interface 8. A RAM addressing register 27 is moreover connected to the accumulator 21, while an output register 28 for the ROM or RAM addresses is connected on the one hand via the parallel connection e to the memories 4, 5, 9 and 10 and on the other hand to the two registers 26 and 27. The three registers 26, 27 and 28 are all twelve-bit registers.

The central unit 6 also comprises a register 18 for preserving ROM addresses which is connected to the addressing register 26 and serves to store a ROM address temporarily during program jumps. A sequence logic network 19 is connected at an input to the timing circuit 11 (FIG. 1) via a connection h and to the decoder 24 and is adapted to generate as output, in known manner, a series of enabling commands and signals for the various operations of the central unit.

The central unit 6 is adapted to exchange four-bit data with the RAM 10 (or RAM 5) in both directions through the medium of the register 20 on the connection a. Moreover, the unit 6 is adapted to exchange data in both directions through the medium of the register 25 along the connection b with the interface 8. Finally, the central unit 6 is adapted to receive selectively from the ROMs 9, along the connection d and through the medium of the register 23, one microinstruction at a time constructed of eight bits, which controls the operation thereof. In addition to the function code, each microinstruction also comprises the address of the register of the RAM 10 containing the datum to be processed.

Each internal ROM 9 (or ROM 4) is addressed by the 12-bit register 26 (FIG. 2) via the register 28 and the connection e with 12-bit parallelism.

Various microprograms are recorded in the internal ROMs 9, each of which may be constituted by a variable number of microinstructions. Each microprogram is selected by addressing the first microinstruction of the microprogram itself. The successive microinstructions of the same program are addressed in known manner by incrementing the address or by means of jumps. The external ROM 4 has a capacity of 2048 bytes and is also addressed by the ROM addresser 26 (FIG. 2) on the connection e.

The microprograms of the external ROM 4 (FIG. 1) constitute, for the major part, variants of the similar microprograms of the internal ROMs 9 and are designed for the needs of the particular user. They are consequently oriented for the particular application (statements of account, invoices, pay slips, etc.). The user therefore resorts to the ROM 4 when he needs not only simple mathematical operations, the programs of which are in the ROMs 9, but also a suitable sequence thereof, appropriately devised for solving a specific problem, with a very close correlation between instants of calculation and instants of printing.

Each module of the RAM 10 is organized in 16 registers R1-R16 (FIG. 3), each of 64 bits, i.e 16 half-bytes each of 4 bits. As many numeric data can be represented in the registers R1-R8. The registers R9 and R10 serve as a keyboard buffer for accommodating 8-bit codes corresponding both to numeric and to function keys depressed on the keyboard 2 (FIG. 1) by the operator.

The register R11 and nine half-bytes of the register R12 serve as an output buffer for accommodating the codes of the data which is to be transmitted to the printer 3. The remaining memory locations are occupied by auxiliary information (program switching elements, counters, etc.), as will be seen better hereinafter.

In the representation of numbers in floating point, the number is recorded in two separate areas of memory, one for the mantissa or fixed part and one for the exponent of the number. The two areas of the memory are defined by associating with each register of a first group of registers R1-R8 a cell 1-8 in each of the registers R13-R15. For example, the exponent of a number, the fixed point part of which is in the register R1, comprises the units digit recorded in the first location 1 of the register R13, the tens digit recorded in the first location of the register R14 and the sign recorded in the first location 1 of the register R15.

The addressing of the memory RAM 10 is effected through the addressing register 27 (FIG. 2) constituted by three portions P1, P2 and P3 of four bits each: that is to say, this register appears at its output as a single twelve-bit register, while it appears at its input as two registers with different connections. The portion P2 is connected to a buffer 15 for exchanging its own contents (bits 1 to 4 of the address) with the accumulator 21. This, in turn, can exchange its contents with the register P1.

The register P2 is adapted to address a particular module and register R1-R16 therein of the memory RAM 10 (FIG. 3), while the register P1 is adapted to address a particular cell 1-16 of the memory RAM 10, so that the two portions P1 and P2 are adapted to address the two portions of a number represented in floating point.

The addressing of the RAM 10 is effected by the register 27 through the output register 28 and the connection e, in a manner similar to that of the ROMs 9 and 4, but at different periods of time of the cycle. To this end, the timing circuit 11 (FIG. 1) is adapted to generate cyclically a sequence of four signals T1, T2, T3 and T4.

Under the control of the signals, the central unit 6 executes at each cycle, in known manner, the following operations:

(a) it zeroizes the ROM and RAM inputs (signals T1 and T3)

(b) it addresses a ROM and reads or writes in the RAM (signal T2)

(c) it addresses a RAM, extracts and executes a microinstruction (signal T4).

Figure 2:
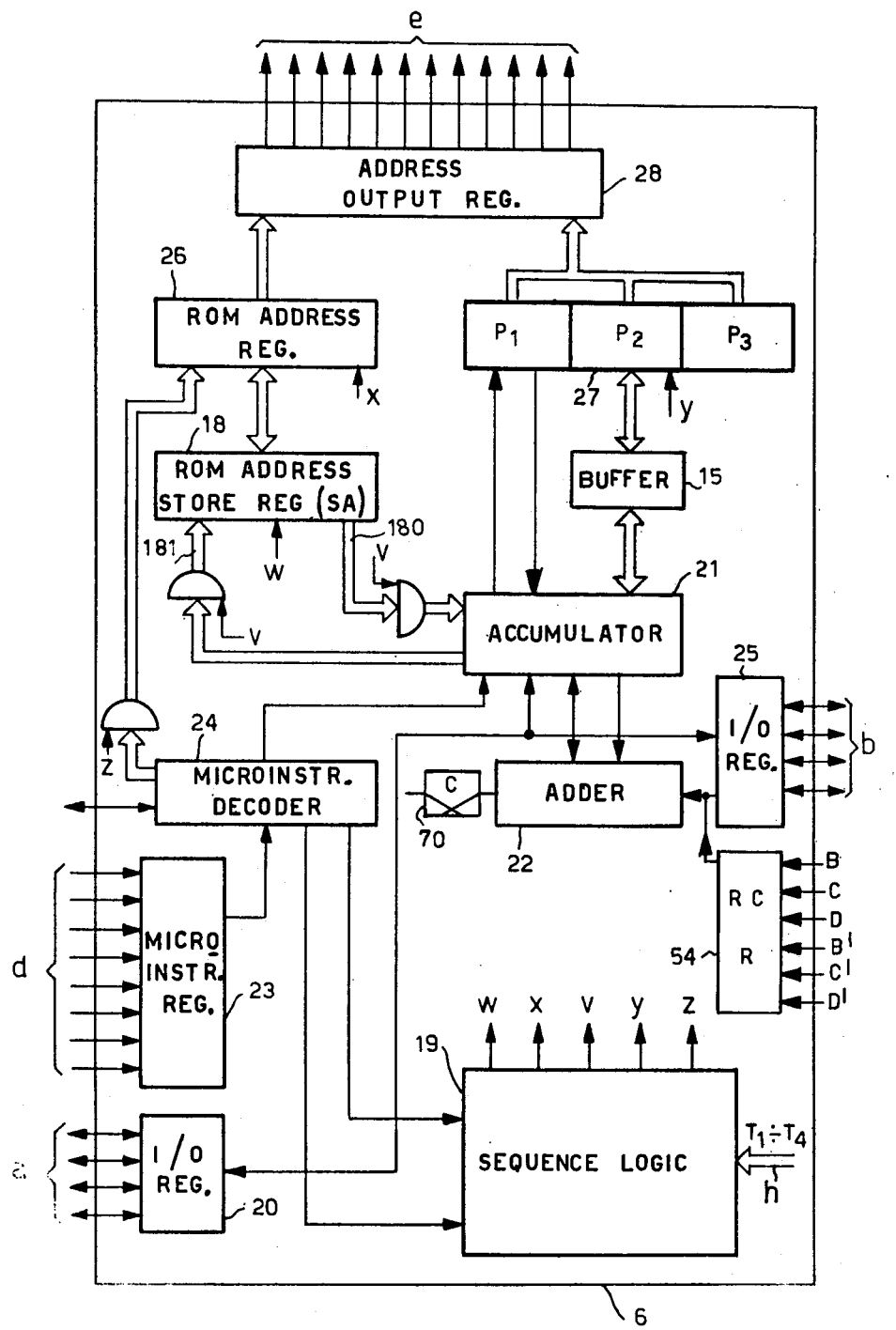
FIG. 2 is a representation of the central unit of the computer.

Each operation of the computer is effected by means of the execution of one or more microinstructions by the central unit 6. For the execution of a microinstruction, the respective address is at first in the addresser 26 (FIG. 2). Under the control of a command X generated by the network 19 in the time T2, this address is sent to the register 28, which addresses the corresponding ROM 9 or 4 (FIG. 1) in known manner through the connection e.

In the following time T4, the microinstruction addressed in this way is transferred via the connection d to the register 23 of the central unit 6 (FIG. 2). The microinstruction extracted in this way is sent from the register 23 in the time T3 to the decoder 24, which decodes it, generating a corresponding function code, while the RAM and ROM inputs are zeroized.

The function code of the microinstruction is sent from the decoder 24 to the sequence logic network 19, while the address of the datum is sent to the accumulator 21. This address is now transferred to the addressing register 27 which, under the control of a signal Y generated by the network 19 in the time T4, is transferred to the register 28. Through the connection e, this register addresses the RAM 10 or the RAM 5.

In the following timing cycle, in the time T2, the reading or writing of the datum of the RAM 10 or 5 addressed in the time T4 of the preceding cycle is produced through the register 20 and the connection a. Section between reading and writing is controlled by the type of microinstruction used and is commanded through the register 20 and the connection a. At the same time, the following microinstruction of the ROM is addressed through the medium of the addresser 26. To this end, if the microinstructions to be used are disposed in succession in the ROM, the register 26 is normally incremented after commanding an addressing. On the other hand if a microinstruction to be executed is not disposed in sequences with the preceding one, the latter must be a jump instruction and contain the address of the microinstruction to which it is desired to jump. In this case, the new address is forced by the decoder 24, through the medium of a signal Z generated by the network 19, to the register 26 and is used for the new addressing operation.

The jump may be utilized to insert a particular routine one or more consecutive times in the development of a program or microprogram. In this case, when the register 26 is forced in this way, its contents are transferred by a command W. of the network 19 to the preserving register 18 in manner known per se. In this case, the last microinstruction of the routine and of the series of routines is a microinstruction for return to the main program. This microinstruction is sent by the decoder 24 to the network 19, which generates a command V. This causes the transfer of the contents of the preserving register 18 to the register 26, which is reinstated in this way with the address following that of the jump microinstruction of the main program.

Figure 3:
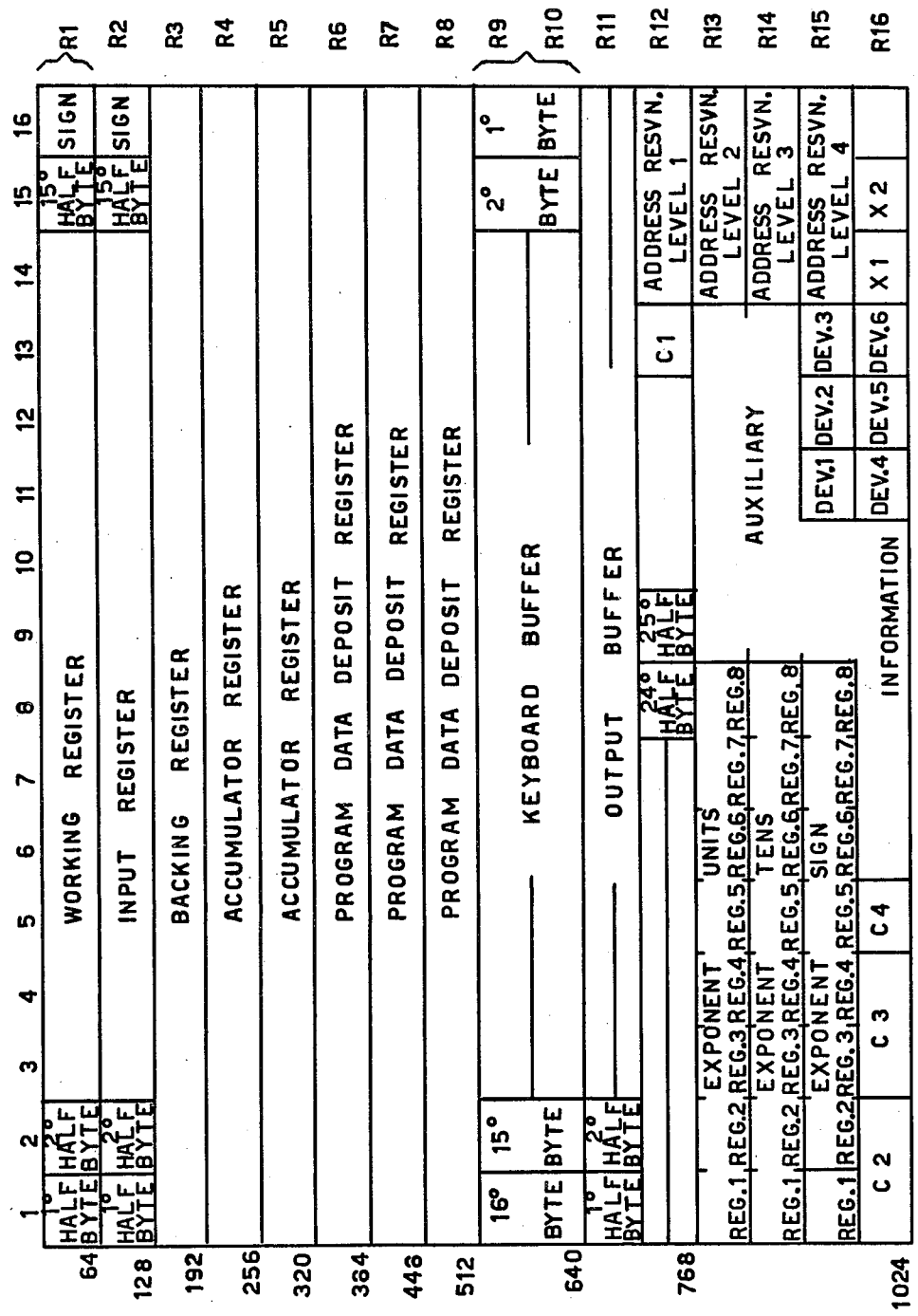
FIG. 3 is a diagram of the arrangement of the memory of the computer.

The keyboard 2 comprises a numeric section 30 (FIG. 4) having a set of keys for entering the digits from 0 to 9 with the algebraic sign in the keyboard buffer R9, R10, (FIG. 3). The section 30 includes a key KB-CL 29 which serves to clear the last datum entered, but not yet used, in the keyboard buffer R9, R10, replacing it by the last datum printed.

The keyboard 2 moreover comprises a function section 31 constituted by a set of function keys which command the corresponding functions. These keys also enter corresponding codes in the keyboard buffer R9, R10. At each entry operation both of the numeric keys and of the function keys, an examination of the code entered is effected in known manner in the buffer R9, R10 to recognise the function codes. When one of these codes is recognised, it is transferred to the register 26 of the central unit 6 (FIG. 2) and addresses a corresponding microprogram contained in the ROMs 9 which, on the basis of the various machine conditions and of the function commanded by the key, controls the relative sequence of operations.

More particularly, an addition key 32 commands the addition of the last datum entered and printed in the accumulator register R4 of the RAM 10 (FIG. 3). A subtraction key 33 serves to subtract the last number entered from the register R4. A multiplication key 34 and a division key 35 serves to prearrange the multiplication and division operations, respectively, between a first number in the register R2 and a second number in the register R3.

An equals key 36 produces the execution of the operation on the last datum entered, with printing of the result of the previously entered multiplication or division. A partial-total (S) key 38 serves to obtain the printing of the contents of the accumulator register R4, after transfer to R2, without zeroizing the register R4. A general total (T) key 39 serves to obtain the printing and zeroizing of the contents of the accumulator R4, after transfer to R2.

List of Instructions Used

For the services performed by the computer which are described here, the following instructions are used, which control the operations indicated in the flow diagrams of FIGS. 6 to 9.

EX effects the exchange between four bits of the accumulator 21 and the cell of the RAM 10 which is currently addressed.

T effects an unconditional jump

LXA loads the buffer 15 from the accumulator 21

LD effects the loading of the register 27 addressing the RAM 10.

LDI effects the transfer to the accumulator 21 of four bits supplied by the instruction itself.

XAX effects the exchange between the accumulator 21 and the buffer 15.

ADI effects the binary addition between the contents of the accumulator 21 and four bits supplied by the instruction itself. The result is always analyzed and, in the event of there being a carry, the next instruction is disregarded and the addresser 26 incremented again. In the opposite case, the contents of the addresser 26 are used to address the next instruction in sequence.

DIB effects the transfer of the data present at the inputs of the central unit 6 to the accumulator 21.

LBL occupies two ROM 9 locations and therefore two memory cycles are necessary for extracting it and executing it. In the first cycle, the first eight bits constitute a single function code which effects the transfer of the second eight bits to the addressing register 27 of the RAM 10.

AND is of the logical type and forms the logical product between the datum present in the accumulator and the four bits of the cell addressed by the register 27. The result of the product remains in the accumulator.

RTN executes the re-entry from a subroutine into the program which has called it. It produces the transfer of the contents of the preserving register 18 to the addressing register 26 of the ROMs 9.

SKZ carries out a test on the accumulator and, in the event of it finding this zeroized, increments the addressor 26 of the ROMs 9, thus causing the skipping of the instruction following the instruction SKZ.

SKC carries out a test on a carry flip-flop 70 in the central unit 6 and, in the event of it finding this set, increments the addresser 26 of the ROMs 9, thus causing the skipping of the instruction following the instruction SKC.

ADSK effects the addition between the accumulator 21 and the memory cell currently addressed by the register 27. In the event of a carry being generated on the flip-flop 20 associated with the adder 22, the instruction ADSK also effects the incrementing of the addresser 26 of the ROMs 9, so as to obtain the skipping of the instruction following the instruction ADSK.

DC effects the decimal correction of the datum present in binary in the accumulator 21.

RC effects the zeroizing of the flip-flop 70 in the central unit 6.

SC effects the positioning of the flip-flop 70 in the central unit 6 at 1.

AD effects addition between the accumulator 21 and the cell of the RAM 10 currently addressed. A possible carry is stored in the flip-flop 70 of the central unit.

LBMX effects the loading, in the bit positions 8-5, of the addressing register 27 of the RAM 10 with the contents of the buffer 15 of the central unit 6.

INCB effects incrementing by 1 in the bit positions 4-1 of the addressing register 27 of the RAM 10. The same instruction, before leaving the control of the central unit 6, carries out a check as to whether these bit positions are now equal to zero, and, in the positive case (that is, in consequence of the capacity of the four positions being exceeded), carries out the incrementing of the addresser 26 of the ROMs 9, thus obtaining the skipping of the immediately following instruction.

CYS enables the connections 180, 181 of the central unit 6, causing the shifting of four places of the preserving register 18 to the right the accumulator 21 and the simultaneous transfer of the four places of the accumulator 21 to places 12-9 of the register 18. With three successive instructions CYS, complete exchange is obtained between the two registers.

Results Control System

In addition to the usual on/off switch 42 of the computer, the console 7 (FIG. 4) comprises a rounding-off selector 43 for selecting the digit at which to round off the result of the processing operations, and a decimals selector 44 for selecting the maximum number of decimals with which the results of the processing operations are to be printed.

The rounding-off selector 43 comprises a thumbwheel 52 which can be rotated so as to position one of the markings carried by the knob 52 in front of a fixed pointer 152.

Figure 4:
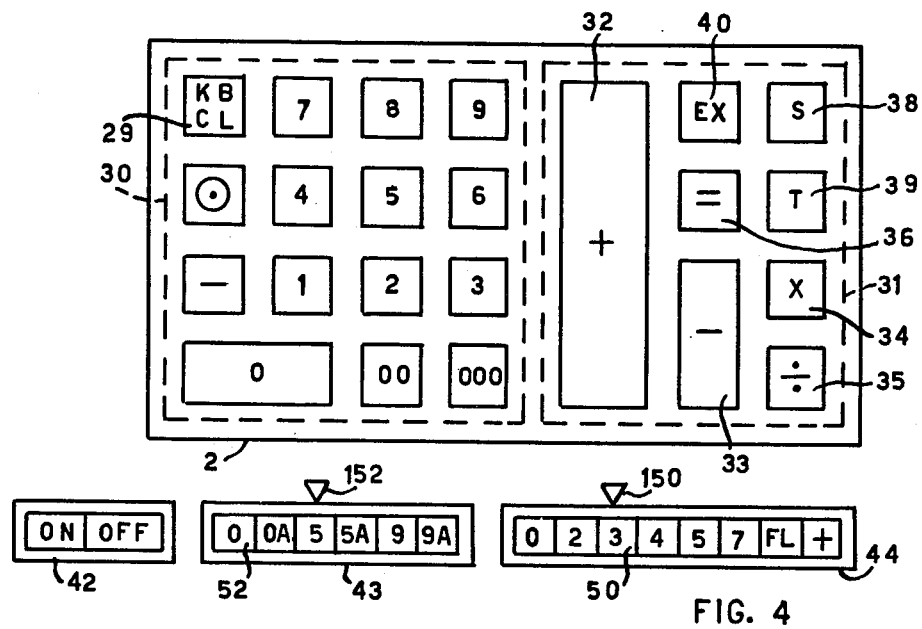
FIG. 4 is a diagram of the keyboard of the computer.

The wheel 52 can adopt six different positions, three of which are indicated by 0, 5 and 9 and three of which, intercalated with the first-mentioned, are indicated by 0A, 5A and 9A. In FIG. 4, for clarity, the markings of the wheel 52 are shown as developed flat.

Similarly, the decimals selector 44 is constituted by a thumb wheel 50 which can be rotated so as to position one of the markings carried by it in front of a fixed pointer 150. These markings comprise the digits 0, 2, 3, 4, 5, 7 and two additional markings FI and +, the significance of which will be seen better hereinafter. The markings of the wheel 50 are also developed flat in FIG. 4.

As will be seen better hereinafter, in positions 0, 5, 9, the rounding-off selector 43 causes the rounding off of the last digit of the result printed by means of the key 38 or 39 after an addition or a subtraction, or by means of the key 36 after a multiplication or division, by a rounding quantity of 0, 5 or 9, respectively.

In positions 0A, 5A, 9A, in addition to the rounding off and the printing of the results, the selector 43 also causes their accumulation in the second accumulator register R5. The rounding-off selector 43 produces the various machine states for the aforesaid rounding off and accumulation operations in dependence upon the position given to the decimals selector 44.

As will be seen better hereinafter, in positions 0, 2, 3, 4, 5, 7, the decimals selector 44 selects as many decimals (after the point) in the printing of the results, while the operands are always operated on with all the decimals with which they are entered. More particularly, if the decimals selector 44 is in position '0', the numbers entered also with decimal digits below the point are accepted for processing, but for the printing both of the input data and of the results they are truncated at the whole part, taking account of the rounding off indicated by the selector 43. This acceptance of decimals in addition permits a greater accuracy of results linked with the possibility of introducing and processing more decimal digits than will then be printed. If the selector 44 is in position "2", the numbers introduced, even with more than two decimals, are accepted for processing, but, for the printing of the input data and the results, they are truncated at the second decimal digit, taking account of the rounding off indicated by the selector 43. The machine behaves similarly for the other positions 3, 4, 5, 7 of the selector. Whenever the number of decimals entered is smaller than the number of decimals provided by the selector 44 for printing, the machine automatically adds the missing zero's in manner known per se.

The selector 44 can adopt a position FL in which it causes the computer to adopt a so-called 'floating point ' mode. In this mode, whatever may be the position of the rounding-off selector 43, the latter is disregarded, so that the machine does not effect roundings off. Moreover, the position FL of the selector 44 produces different operations according to the particular ROM 4 inserted in the machine by the user, that is according to the particular microprograms contained therein.

More particularly, the ROMs 4 may be of two different types, a first, so-called administrative, type for problems of an accounting nature, and a second, so-called scientific, type for calculations of a technical or scientific nature. As will be seen better hereinafter, the two types of ROM 4 control a different type of operation of the computer. If a ROM 4 of administrative type is connected, the machine calculates taking account of all the resulting decimals which do not exceed the capacity of the registers (15 digits). If the capacity is exceeded, all the decimals of lower order are truncated. On the other hand, if a ROM 4 of so-called scientific type is connected, the decimals selector 44 effects in position FL a prearrangement of the function keyboard which will be seen better hereinafter and facilitating calculation in scientific notation.

The selector 44 can also adopt an additional position "+" in which it selects a predetermined number of decimals for the result. The position "+" of the selector 44 conditions a mode of the machine called the 'ADD-MODE', in which in particular the numbers introduced are considered always with two decimals, this number of decimals being typical both in the case of monetary values and in that of measurements or weights. The numbers entered are accepted with two decimals, without the operator actuating the decimal point key 28. The decimal point is inserted automatically by the computer, in the printing stage, to the left of the two least significant digits introduced on the keyboard. Obviously, all the digits entered are printed.

As will be seen hereinafter, if, with the selector 44 in position "+", the operator also introduces the decimal point by means of the key 28, this causes a suspension of the ADD-MODE state and produces a machine state which corresponds to the shifting of the said selector 44 into position "2", for calculation with two decimals. In this case, therefore, all the decimals entered are accepted for processing, but are printed with two decimals, while the result is truncated at two decimal digits. Moreover, if, after actuating the key 28, the operator enters a number of decimal digits lower than two, the machine automatically inserts the missing zero's.

For the conditioning of the machine in the various modes hereinbefore seen, the wheel 50 of the selector 44 is fast with a radial electric contact 50' (FIG. 5) which can co-operate with a series of electric contacts 51 in the form of circular segments concentric with the centre of rotation of the wheel 50. The contact 51a, forming a complete circle, has the smallest diameter and is connected to a source of positive d.c. voltage. Successively with a larger diameter, the contact 51b is formed by one semicircular segment, the contact 51c is formed by two segments each having a span of 90°, and the contact 51d is formed by three segments, the first with a span of 90° and the second and third with a span of 45°.

The two segments of the contact 51c are interconnected electrically, just as are the three segments of the contact 51d. Moreover, the contact 51b one of the two segments of the contact 51d are connected to the central unit 6 via three connections B, C and D, respectively, connected in turn, via suitable load resistors 49, to a source of negative voltage. Therefore, connection between the decimals selector 44 (FIG. 4) and the central unit 6 (FIG. 2) is achieved by three connections B, C, D through which current flows when the contact 51a is connected by the radial contact 50' of the knob 50 to one of the segments of the other contacts 51. There can then be created, with the possible binary electric states of the three connections B, C, D, eight different configurations of signals corresponding to the eight different positions of the decimals selector 44, which are presented at a results control register RCE 54 (FIG. 2) included in the central unit 6.

Figure 5:
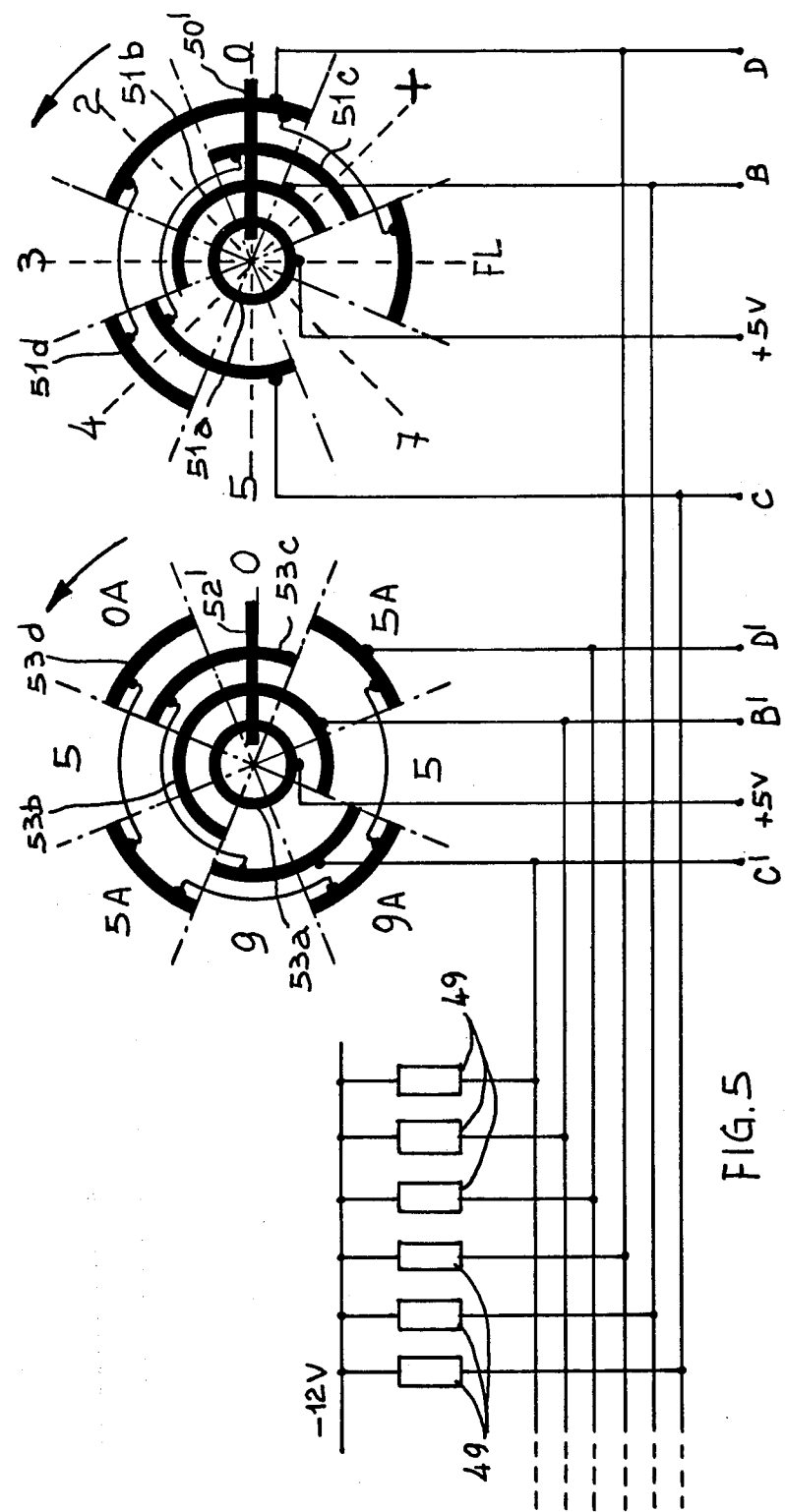
FIG. 5 is a detail diagram of a results control system of the computer.
Figure 6:
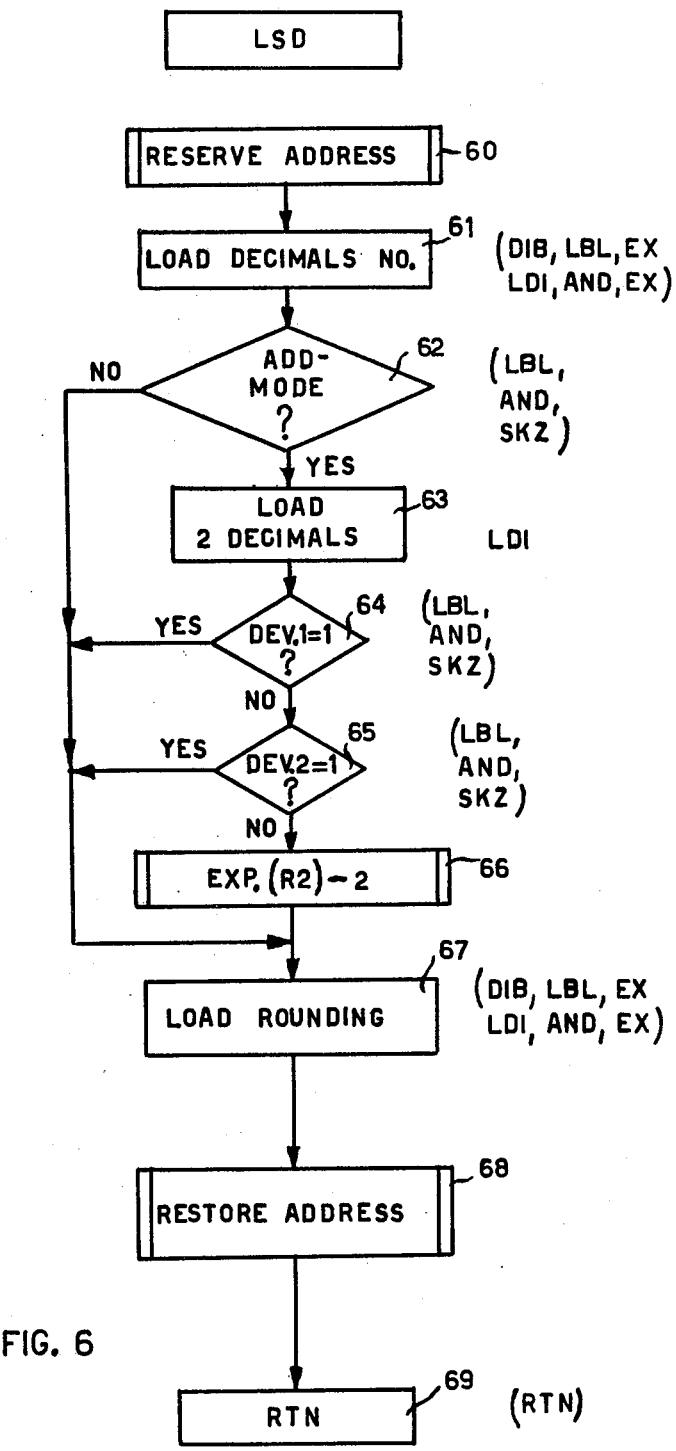

In FIG. 5, the contact 50' is in the position O of the knob 50. The register 54 is connected to the adder 22 in a similar manner to the register 25.

The individual configurations of the signals in correspondence with the positions of the knob 50 of the selector 44 (FIG. 5) superposed from time to time on the contacts 51 are indicated in the following TABLE I, in which 0 indicates that there is closed contact and 1 that there is not closed contact.

TABLE I
TABLE OF SELECTOR POSITION CODES

| CONTACTS DECIMALS | 51a b c d | 51a b d | 51a b | 51a c d | 51a c | 51a | 51a d | 51a d c |
|---|---|---|---|---|---|---|---|---|
| 0 | 000 | | | | | | | |
| 2 | | 010 | | | | | | |
| 3 | | | 011 | | | | | |
| 4 | | | | 100 | | | | |
| 5 | | | | | 101 | | | |
| 7 | | | | | | 111 | | |
| FL | | | | | | | 110 | |
| + | | | | | | | | 001 |

Via the register 54 and the adder 22, each configuration of TABLE I is adapted to address a corresponding microprogram of the ROMs 9 and 4, as will be seen better hereinafter.

Similarly, the wheel 52 of the rounding-off selector 43 is fast with a radial electric contact 52' (FIG. 5) which can co-operate with a second series of circular electric contacts 53a, 53b, 53c, 53d concentric with the centre of rotation of the wheel 52.

The contact 53a forms a complete circle and is connected to a source of positive d.c. voltage. The contact 53b is formed by a single circular sector of 270°, the contact 53c is formed by two opposite circular sectors, each of 90°, and the contact 53d is formed by four circular sectors which are opposite in pairs and each of 45°.

The two segments 53c are interconnected electrically, just as are the four segments 53d. Moreover, the contact 53b, one of the two segments 53c and one of the four segments 53d are connected to the register 54 of the central unit 6 via three connections B', C' and D', respectively, connected in turn via suitable load resistors 49 (FIG. 5) to the source of negative voltage.

Current flows through the three connections B', C', D' when the contact 53a is connected by the radial contact 52' of the knob 52 to one of the segments 53. In this way, with the eight possible binary electric states of the three connections B', C', D', there are created eight different configurations of signals which are presented at the register 54 of the central unit 6 and correspond to the eight different positions of the rounding-off selector 43, (positions 5 and 5A being duplicated). In FIG. 5, the contact 52' is in the position O of the knob 52. The individual configurations of signals in correspondence with the positions of the knob 52 of the selector 43 are indicated in the following TABLE II.

TABLE II
TABLE OF SELECTOR POSITION CODES

| CONTACTS Pos. Of Rounding-Off Selector | 53a b c | 53a b c d | 53a b d | 53a b d | 53a c d | 53a c d | 53a b | 53a b d |
|---|---|---|---|---|---|---|---|---|
| 0 | 110 | | | | | | | |
| 0A | | 111 | | | | | | |
| 5 | | | 100 | | | | | |
| 5A | | | | 101 | | | | |
| 9 | | | | | 010 | | | |
| 9A | | | | | | 011 | | |
| 5 | | | | | | | 100 | |
| 5A | | | | | | | | 101 |

Each configuration of TABLE II is adapted to address a corresponding microprogram of the ROMs 9 and 4.

A loading routine LSD recorded in one of the ROMs 9 is designed for control of the introduction of the digit indicated by the decimals selector 44 on the entry of numbers from the keyboard.

With the machine in operation, the three signals B, C, D generated by the decimals selector 44 are staticized in the register 54 of the central unit 6. When a number is entered through the numeric keyboard, in addition to the algebraic sign, the decimal point is generally entered by depressing the key 28 in sequence with the digits.

Then, on the depression of a function key 32–35 (FIG. 4), the respective microprogram, in the presence of a number in the buffer R9–R10, controls by means of a subroutine common to all, the transfer of the number from the register R9–R10 to one of the working registers of the RAM 10, transforming the number from decimal notation to floating-point or scientific notation, in which the mantissa or fixed point part of the number is stored in the registers R2–R8 (FIG. 3), while the exponent which indicates the position of the decimal point is stored with its sign in corresponding cells of the registers R13–R15.

After the entry of a number on the keyboard, it is generally transferred to the input register R2 if it must be processed immediately (for example, the four arithmetical operations) or to one of the other registers R3–R8, if it constitutes a constant datum or a datum to be processed afterwards. The microprogram called by the key depressed now controls a jump to the routine LSD.

The first operation of the routine LSD (block 60 of FIG. 6) consists in storing the current ROM 9 address, which represents the last instruction carried out in the RAM 10, for the purpose of being able to re-use this address at the end of the routine.

Operation 61 then follows, in which the signals which represent the number of decimals set on the selector 44 are transferred from the register 54 to the cell O of the register R8 of the memory RAM 10. After this, by the operation 62 there is effected a comparison between the signals just stored and the code 001 called to the accumulator 21 from the ROM 9. Since the code 001 corresponds to the position "+" of the selector 44, that is to the ADD-MODE state, this comparison indicates whether the selector 44 is in this state or not. In the negative case, that is if the selector is set at a digit which indicates the number of decimals required in the printing, the routine LSD effects a jump to operation 67, which takes account of the setting of the selector 43 and which will be seen better hereinafter.

In the positive case, that is if the selector 44 is set in the position "+" of the ADD-MODE, the key 28 is normally not actuated, so that the number entered on the numeric keyboard 30 is transferred to one of the registers R2–R8 as if it were a whole number. Since, in the ADD-MODE, calculation is effected considering the last two digits entered as decimals, it is necessary to reduce the exponent of the number introduced into the cells of the registers R13–R14 corresponding to one of the registers R2–R8 by two units. This is equivalent, in decimal notation, to entering the point at the penultimate position to the left, that is to considering the last two digits entered as decimals.

To this end, operation 63 is now carried out, which consists in substituting, in the cell O of the register R8 of the RAM 10, the binary code 010 corresponding to position 2 of the selector 44 (TABLE I) for the code 001 corresponding to position "+" of the selector 44.

Operation 64 follows, which is an examination of a switching element DEV 1 (FIG. 3), represented by a single bit of the register R15 of the RAM 10, which, in known manner, is always set at 1 on the switching-on of the machine and is set at zero at the end of each processing operation, every time a numeric key is actuated.

In our case, the examination 64 DEV 1=1, ?gives a negative result, so that the subroutine commands the execution of operation 65, which is again an examination of a second switching element DEV 2. This switching element is also a single bit of the register R15 (FIG. 3) of the RAM 10. This is set in known manner at 1 every time the decimal point is introduced by the key 28 (FIG. 4) and is set at zero at the end of each processing operation.

The examination 65 of the switching element DEV 2 enables the two possibilities to be distinguished, that is that the number entered has been introduced as whole or as decimal. In our case, the examination gives a negative result and the next operation 66 to be executed is a subroutine, described in detail hereinafter, which reduces the exponent of the number introduced by two.

Considering now the eventuality that the examination 64 of the switching element DEV1 or the examination 65 of the switching element DEV2 gives a positive result, a jump is made to operation 67, so that in both cases operation 66 is not executed. In fact, in the event of the switching element DEV1 being set at 1, this means that no digit has been entered on the keyboard. The relative operation is now effected on the operand of the preceding operation which remains in the register R2 until it is replaced by another, or on a datum called from another of the registers R2–R8.

The capacity of the machine for maintaining a "constant" datum must, however, take account of the fact that, if the "ADD-MODE" state remains, the exponent of the constant datum which has already been decremented in the preceding operation must not be further reduced, and the operation 66 is therefore excluded.

The operation 66 of decrementing the exponent of the datum introduced must also be excluded when the examination 65 gives a positive result, this meaning that the decimal point has been entered on the keyboard notwithstanding the "ADD-MODE" state. In this case, therefore, the operator can introduce any number of decimals and the exponent will assume the value corresponding to the position of the decimal point entered in the number. Since, however, the selector 44 remains set in the position "+", the machine behaves for the rest as if the selector were set in position 2, since the RAM 10 has been loaded with two decimals by means of operation 63. It is therefore clear that, for the purpose of more accurate processing, the operator has the possibility, by entering the point in the "ADD-MODE" state, of causing the machine to accept any number of decimals without having to effect operation of the selector 44 for this purpose.

Operation 67 now follows, which effects the loading into cell 1 of the register R8 of the RAM 10 of the code corresponding to the position of the rounding-off selector 43. This code has been sent through the connections B', C', D' to the register 54 of the central unit 6 and is staticized therein. This code indicates the digit 0, 5 or 9 to which the result of a processing operation is to be rounded off.

Operation 67 also effects the setting of the switching element DEV 3 included in the register R15 of the RAM 10 (FIG. 3). The switching element DEV3 is set at 1 in the case in which the selector 43 is located in one of the positions 0A, 5A, 9A for rounding off and accumulation of the result in the accumulator register R5 (FIG. 3). On the other hand, the switching element DEV3 is set at zero when the selector 43 is in the positions 0, 5 or 9. The routine LSD terminates with the operation 68, which consists of a subroutine which transfers the address stored in the RAM 10 by the operation 60 to the addresser 26 of the central unit 6 (FIG. 2) to command re-entry into the starting routine of the ROM 9. Finally, an operation 69 effects a jump to the address transferred in this way to the register 26 to cause the machine to resume execution of the starting microprogram.

Figure 7:
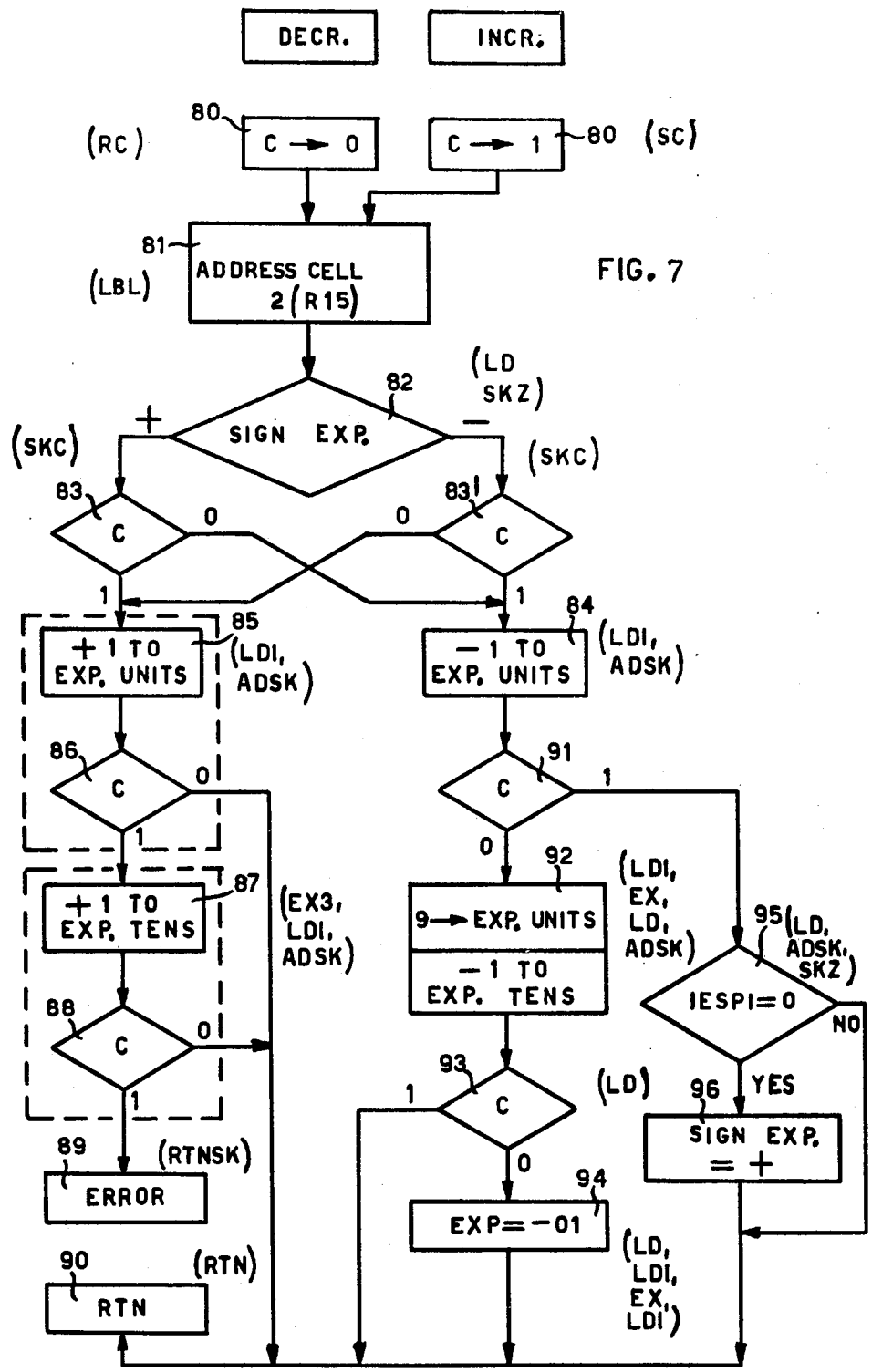

FIG. 7 is the flow diagram of the subroutine 66 which commands the decrementing of the exponent of the number entered by one unit. Since the subroutine 66 is carried out in ADD-MODE operation, which sets two decimal digits, the execution of the subroutine 66 for obtaining the decrementing of the exponent by two is a decrementing by one performed twice.

The subroutine 66 is adapted to effect both the decrementing and the incrementing of the register R2. In order to distinguish between these two functions, the subroutine is accessed from two different inputs or addresses. The first corresponds to the positioning of the flip-flop 70 of the central unit at zero; the second corresponds to the positioning of the same flip-flop 70 at 1. This flip-flop is connected to the adder 22 in the central unit 6 and is adapted to receive the possible carry which is created in an addition of two digits in binary-decimal form which proves greater than 15.

The positioning of the flip-flop 70 is commanded by an operation 80 of the subroutine 66 (FIG. 7). Thereafter, this initiates the operation 81, in which the cell 2 of the register R15 (FIG. 3) containing the sign of the exponent of the register R2 is addressed and copied in the accumulator 21 (FIG. 2) of the central unit 6. Here, by the following examination operation 82 (FIG. 7), the microinstruction SKC causes the examination of the sign of the exponent which, according to whether it is positive or negative, conditions an examination of the flip-flop 70 (FIG. 2) which, however, has different consequences in the two cases.

In the first case, in which the sign of the exponent is positive, the examination which follows the examination 82 is indicated here by the reference 83. If the flip-flop 70 is at zero, an operation 84 is now carried out which causes the exponent to be decremented, that is −1 is added in the adder 22 to the units of the exponent formed, as has been said, of two digits. If, on the other hand, the flip-flop 70 is set at 1, an operation 85 is carried out which causes the exponent to be incremented by 1, still by way of the adder 22.

In the second case, in which the sign of the exponent is negative, the examination which follows the examination 82 is indicated here by the reference 83′, although it is the same examination indicated by the reference 83. Following the examination 83′, if the flip-flop 70 is set at 1, the subroutine goes on to the incrementing operation 84 which, since a negative exponent is concerned, is achieved by now adding −1 in the adder 22. On the other hand, if the flip-flop 70 is set at zero, the examination 83′ is followed by the decrementing operation, to add +1 to the negative exponent.

Each time the operation 85 is effected, it is followed by a fresh examination 86 of the flip-flop 70 which, if it is now at 1, indicates that a carry to be transmitted to the tens digit has been generated in the operation 85. In this case there follows an operation 87 which adds 1 to the tens digit of the exponent. If, on the other hand, the examination 86 indicates that the flip-flop is at 0, the subroutine goes on to an operation 90 of re-entry into the routine of FIG. 6 to effect the operation 67. After the operation 87, a further examination 88 of the flip-flop 70 takes place. In the event of the operation 87 having generated a further carry (exponent greater than 99), the flip-flop 70 is again at 1 and generates an operation 89 of signalling of error owing to the capacity of the exponent being exceeded. If, on the other hand, the examination 88 indicates that the flip-flop 70 is at zero, the re-entry operation 90 is effected.

Each time the operation 84 is effected, it is followed by an examination 91 of the flip-flop 70. Following the operation 84, which is a subtraction, the flip-flop 70 should be set at 1, even if it was not already thereat following the operation 80. In fact, the subtraction of 1 is effected in binary decimal as the addition of 15 to the minuend. Therefore, the carry in the adder 22 is effected each time that the digit of the exponent is different from zero, while if it is zero it is necessary to effect correction to reduce the tens digit of the exponent by one.

Therefore, if the flip-flop 70 is at zero, the subroutine now goes on to the correction operation 92, in which a nine is loaded into the units digit of the exponent and the tens digit is decremented. Then, by means of the examination 93, it is checked whether this further subtraction has generated a carry, in which case the subroutine goes on to the operation 90 of re-entry into the routine. If, on the other hand, the flip-flop 70 is still at zero, as in the case of an exponent equal to 00, a 1 is loaded by the operation 94 into the units digit of the exponent, a zero is loaded into the tens digit and the − sign is entered in the exponent. In this case also, the subroutine then goes on to the re-entry operation 90.

On the other hand, in the event of the examination 91 having given the answer 1, an examination 95 of the accumulator 21 is effected to determine whether the digit of the exponent after the operation 84 is equal to zero, in which case an operation 96 is effected in which the "+" sign is imposed on the exponent. After the operation 96, the subroutine goes on to the operation 90 of re-entry into the routine. In the opposite case, the exponent remains with its own sign and the subroutine passes directly from the examination 95 to the re-entry operation 90. It is therefore clear that, with the selector 44 in the position "+" and if the decimal point key 28 is not depressed, the exponent is modified to indicate that the number entered must be considered as having two decimal digits.

FIG. 8 is the flow diagram of the subroutine 60 of reservation of the jump address and of the subroutine 68 of re-entry into the main microprogram. In reality, the two subroutines 60 and 68 are alike and differ in accordance with two different inputs or initial conditionings.

In the memory RAM 10 (FIG. 3) there are provided three cells 14, 15 and 16 of the registers R12, R13, R14, R15 which are adapted to contain in succession, that is on a plurality of levels, the program addresses to which to return after the execution of a plurality of subroutines nested at a plurality of levels, that is so that the execution of one is interrupted by another and so on. The first 12-bit address will be sent to the cells 14, 15, 16 of the register R12, the next to the corresponding cells of the register R13. If a further nesting takes place, it is necessary furthermore to reserve an address which will therefore go into the cells 14, 15, 16 of the register R14. If, however, the preceding subroutine terminates without a further nesting, it is necessary to restore the preceding address level, that is return to examine the register R13.

For the purpose of handling these steps forward and steps backward in the so-called "stack" of the four address levels, the cell 13 of the register R12 is used as an index of the level (1, 2, 3, 4) of address reservation. That is, the registers R12-R15 will be addressed indirectly according to the contents of this index. Let it be assumed that the index contains the value 2. If it is necessary to carry out a further nesting, it will be sufficient to increment this value by 1 to address the register R14 indirectly and record the re-entry address therein. If, on the other hand, it is necessary to the starting subroutine, this value is decremented by 1 and the re-entry is effected at the preceding level at the address recorded before in the register R13. Since a decrementing by 1 is obtained by an addition of 15 to the minuend, the diversification of the subroutine according to whether it is a question of an address reservation 60 or an address restoration 68 is effected at the beginning of the subroutine.

In the first case, 1 is entered in the accumulator 21 (operation 100), in the second 15 is added in the accumulator 21 (operation 101).

In both cases, operation 102 is thereafter effected, which addresses the cell 13 of the register R12, which contains the level number. There follows the operation 103, which zeroizes the flip-flop 70 (FIG. 2). Then, by the operation 104, the level number addressed is added to the accumulator set in the operation 100 and 101. By the operation 105 an exchange is then performed between the values of the accumulator 21 and the address reservation index of the cell 13 of the register R12. These differ now still by one unit. If there has been a restoration of address, the reservation index is smaller than the contents of the accumulator. In this case, the flip-flop 70 is at 1. It is examined by the operation 106, which gives a positive result and now causes the operation 107 of copying of the index in the accumulator 21, which thus equals the index itself.

If the operation 106 gives a negative result, the index is greater than the contents of the accumulator 21. This means that the index now reserves an address of the level following that previously indicated by the index, for which reason the operation 107 is skipped. In both cases there is now carried out a series of operations 108-117 by which is created the address of one of the registers R12-R15 of the RAM 10 where there is stored the address of re-entry into the main microprogram which it is desired to reserve or restore. To this end there is created in succession in the addresser 27 of the central unit 6 the address of the cells 14, 15, 16 in the register containing the level to be reserved or restored. More particularly, 12 is added to the contents of the accumulator 21 by the operation 108. In this way, if as in the example given, the current index is 2 and a restoration of address is concerned, the index is decremented from 2 to 1, after the operation 107 the cell 13 of the index and the accumulator 21 contain the same value 1, after the operation 108 the accumulator 21 will contain 13: that is, once the index has been decremented, the level to be restored is always that of the register R13 reserved before. If, on the other hand, reservation of address is concerned, after the operation 105 the index has the value 3 and the accumulator 21 contains 2. After the operation 108, the accumulator 21 contains 14, so that it is clear that the level 3 addresses the register R14 (FIG. 3).

The address of the register to be addressed having been identified in this way, this address is transferred by the exchange operation 109 and the copying operation 110 from the accumulator 21 to the buffer 15 (FIG. 2) first and then to the portion P2 of the register 27, that is to the cells 5-8 of the addresser 27.

By the operation 111 (FIG. 8), the previous contents of the buffer 15 preserved in the accumulator 21 are brought back to the buffer and provision is then made by the operation 112 for incrementing the portion P1 of the register 27, that is cells 4-1 of the addresser 27, which were containing the address of the cell 13 of the register R12 which in turn contains the address reservation index.

A shift along the connection 180 (FIG. 2) between the register 18 and the accumulator 21 is now performed by the operation 113. This connection concerns only the four bits on the right of the preserving register 18, which are sent to the accumulator 21, which has arbitrary contents and, through the connection 181, simultaneously sends the four bits on the right into the four locations on the left of the same register 18.

The four bits shifted from the register 18 to the accumulator 21 are now transferred through the medium of the register 25 to the cell of the memory RAM 10 addressed by the operations 108-112. In turn, the contents of this cell are sent, still through the medium of the register 25, to the accumulator 21, so that the contents of the first cell of the register addressed in the RAM 10 are exchanged with the contents of the accumulator 21. By the operation 115 (FIG. 8), the portion P1 of the register 27 is now incremented for addressing the cell 15, a check being made that the situation in which the capacity (16) of the portion P1 has been exceeded has not been reached (operation 116).

Until this excess occurs, the cycle 113-116 is repeated, addressing the successive cells (in this case the cells 14, 15 and 16). When the exceeding of capacity occurs, the cycle of the operations 113-116 is interrupted and a further shift from the register 18 to the accumulator 21 is performed in an operation 117 to take account of the fact that the first of the three shifts in the operation 113 had inserted the arbitrary contents of the accumulator 21 on the left of the register 18.

At this point, the subroutine terminates with an operation 118 of return to the routine LSD (FIG. 6) which has called it, which now continues with the operation of re-entry into the main microprogram, which now controls the other operations required by the function of the key actuated before the datum is printed.

Printing Control System

Figure 9:
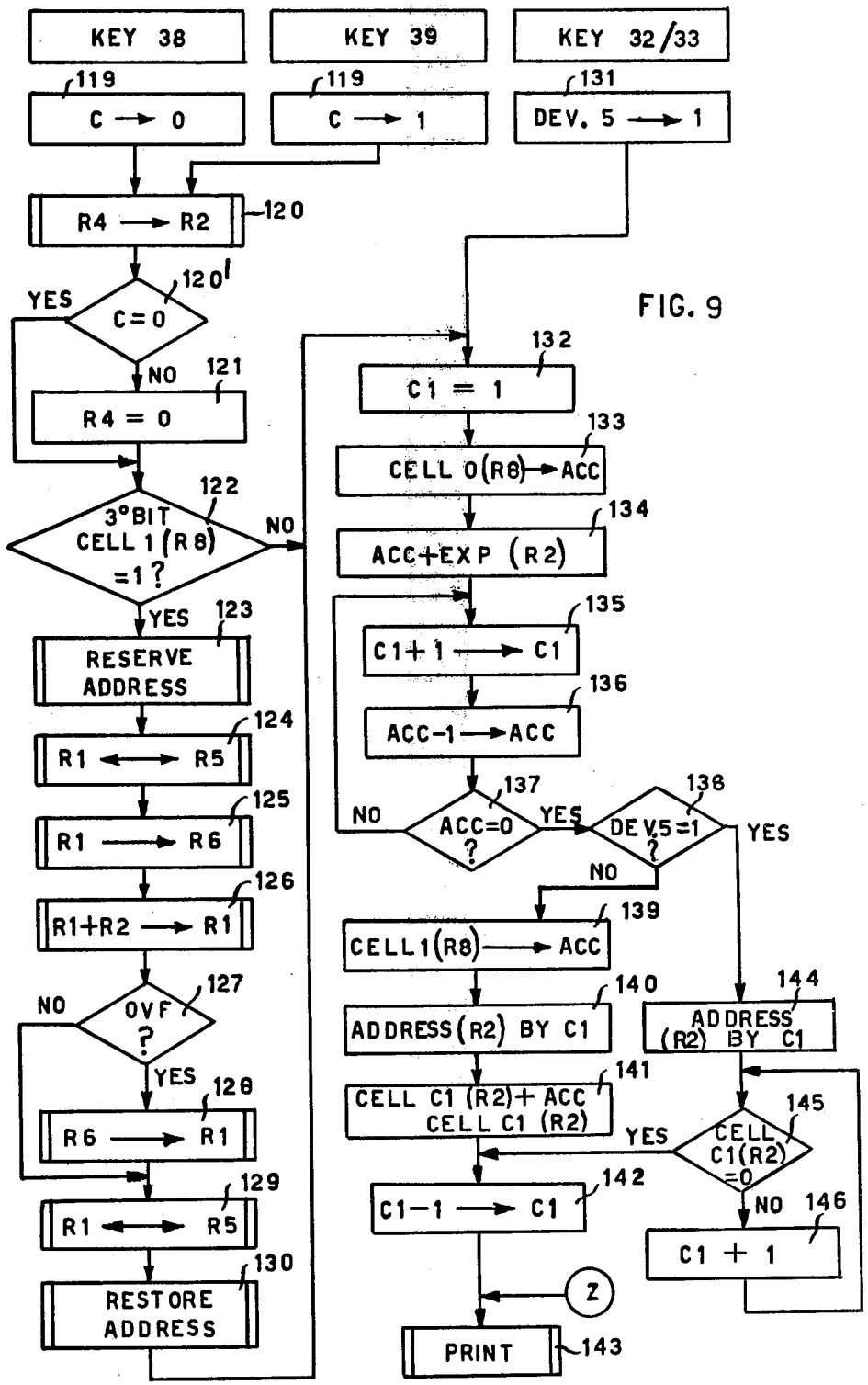

FIG. 9 illustrates the flow diagram of a routine of control of the printing of a datum or result in which the conditions imposed by the selectors 43 and 44 are analyzed and influence the operations themselves. Since the most complex routine is that relating to the printing of a result, this case will be described first. It has been seen before that the rounding-off selector 43 can be set in one of the accumulation positions 0A, 5A, 9A. In this case, in known manner, the microprogram generated by one of the keys 38, 39 causes the accumulation of the unrounded total in the register R5.

To this end, as has been seen in TABLE II, for each of the said three positions the selector 43 generates a binary code which arrives at the inputs B', C', D' of the register 54 of the central unit 6 (FIG. 2) and which has the third bit always equal to 1, in contrast to the codes generated in positions 0, 5, 9, in which the third bit is always equal to zero. Therefore, the two groups of three of possible positions of the selector 43 are distinguished and, in particular, the "accumulation" state is recognized by the examination in the central unit 6 of this bit of the code generated by the selector 43, every time a function key is actuated on the keyboard 31.

For the control of the printing, both the microprogram corresponding to the partial total key 38 and that corresponding to the general total key 39 commands an operation 119 (FIG. 9) of positioning of the flip-flop 70. This goes to zero if the key 38 is concerned and goes to 1 if the key 39 is concerned. Thereafter, the central unit 6 executes a subroutine 120 which causes the total contained in the register R4 to be transferred to the register R2 of the RAM 10 to prearrange the same for printing. After an examination 120' of the flip-flop 70, the subroutine 120 provides for zeroizing the register R4 cell to cell (subroutine 121) if the flip-flop 70 is at 1, substantially as described in the said Italian Patent Application No. 67212-A/75.

Cell 1 of the register R8 in which the code of the position of the selector 43 is stored is now analyzed by an examination 122. If this cell has its third bit equal to 1, the operations of accumulation are proceeded with. In the opposite case, a jump is made to operation 132 hereinafter described. For the accumulation, an address reservation subroutine 123 equal to the subroutine 60 of the routine LSD already described is now executed. By this operation, the re-entry address after the accumulation has been effected is reserved in the RAM 10.

By a subroutine 124, the contents of the register R5 are now exchanged with the contents of the working register R1, which now contains the general total to be updated. Then, by a subroutine 125, the register R1 transfers its contents to the deposit register R6.

At this point, a subroutine 126 forms the sum between the contents of the register R2 and of the register R1. During this addition, an exceeding of capacity (OVF) may occur, which is analyzed by an examination 127. In the affirmative case, a return to R1 of the original value of R5 is now produced, the addition effected by the operation 126 not being acceptable. A capacity-exceeded signal E is also sent to the printer 3 for signalling to the operator.

In the event of the examination 127 giving a negative result, on the other hand, a jump is made to a subroutine 129 which causes the same exchange of the subroutine 124 to be initiated to bring back to the register R5 of the general total updated by the addition of the toal unloaded from the register R2, which is to be printed. Thereafter, a subroutine 130 which controls the restoration of the address of re-entry into the main routine is executed.

This routine now continues with the operation 132, by which is executed the recording of a 1 in the counter C1, which is now used as an index register for addressing the individual cells of the register R2. As already mentioned, the operation 132 is arrived at directly in consequence of the examination 122 giving a negative result, so that it is clear that the positions 0, 5 and 9 of the rounding-off selector 43 which have the third bit zero do not generate the routines 123-129 and, therefore, the accumulation of the contents of R2 to be printed in the register R5 is not effected.

Operation 133 now follows, in which the cell 0 of the register R8, in which the decimals digit entered on the selector 44 is stored, is transferred to the accumulator 21 of the central unit 6 (FIG. 2), and to this digit there is added, by the operation 134, the exponent of the number recorded in the register R2. In fact, since the exponent of a floating point number represents the number of whole digits contained therein and therefore the position of the point, the sum of the digit of the decimals set in the selector and the exponent now stored in the accumulator 21 identifies the last decimal digit of the number to be printed.

The operation 135 is now effected, in which the index register C1 (FIG. 3) is incremented by one, and, by the operation 136 (FIG. 9), the accumulator 21 is decremented by one. Under the control of an examination 137 of the accumulator 21, the operations 135 and 136 are repeated until the said accumulator is zeroized, so that the register C1 contains the index which defines the cell of the register R2 containing the decimal digit following the last digit to be printed.

If the examination 137 gives a positive result, there is effected a further examination 138 of the switching element DEV5 (FIG. 3) which, as will be seen hereinafter, is set at 1 following the actuation of the key 32 or 33. In the case being considered, the examination 138 therefore gives a negative result and causes the operation 139, in which the now zeroized accumulator 21 receives the rounding off digit 0, 5 or 9 from the cell 1 of the register R8.

By the operation 140, the cell of the register R2 denoted by C1 is now addressed in accordance with the contents of that cell. The operation 141 now follows which, in order to effect the desired rounding off, adds the contents of the cell addressed by the register C1 to the contents of the accumulator 21, so that the principle of the desired rounding off at 0, 5 or 9 is carried out by adding 0, 5 and 9, respectively, to the digit following that to be rounded off and propagating the possible carry in known manner to the left.

Immediately afterwards, by an operation 142, the register C1 is decremented and now indicates the address of the digit of lower order of the register R2 which is to be printed.

A printing subroutine 143 is now executed under the control of the central unit and causes the printing unit 3 (FIG. 1) to print the digit of the register R2 indicated by the register C1, while this is decremented. The subroutine 143 is repeated until the register C1 is zeroized, so that there are printed in succession in known manner the digits of R2 to the left of the first with the corresponding decimal point or possible special function symbols.

If, instead of the key 38 or the key 39, the addition key 32 or the subtraction key 33 is actuated, the corresponding routine of control of the printing begins with an operation 131 of setting a switching element DEV5 of the RAM 10 (FIG. 3) at one. Then follow the operations 132-137 (FIG. 9) seen hereinbefore. Since the switching element DEV5 is now at one, instead of the rounding-off operations 139-141, an operation 144 of addressing of the cell of the register R2 with the contents of the register C1 is executed, which, as seen hereinbefore, now represents the digit immediately to the right of the lowest decimal digit provided by the selector 44 for printing. An examination 145 of the cell of R2 addressed in this way now follows. If this cell is at zero, the operation 142 is effected, so that the printing of the decimals provided by the selector 44 begins even if they are constituted by zeros.

If, on the other hand, the cell of R2 addressed is not at zero, there is effected an operation 146 of incrementing of the register C1 which is repeated until the examination 145 gives a positive result, so that the register C1 now indicates the digit to the right of the last decimal digit entered and the printing unit 3 now prints all the decimal digits entered, even in excess of those provided by the selector 44.

"FL" Machine Mode

Reverting to considering the position FL of the decimals selector 44, as has already been seen, the machine mode which this position conditions is governed by the microprograms present in the ROM 4 connected from outside to the machine at the choice of the operator.

If the ROM 4 introduced contains microprograms adapted to solve commercial or administrative problems, the position "FL" of the selector constitutes prearrangement of microprogram to take account of all the significant decimals processed, that is different from zero. This is on condition that the total of the whole digits and decimals does not exceed 15, in which case the excess decimals in the results are truncated in the transfer to the output register R2 (FIG. 3).

The special feature of operation of the machine in this state is that the results are examined decimal digit by decimal digit until the capacity is exceeded; the decimal zeros are truncated, but even a single significant digit following decimal zeros causes complete printing of the number.

Figure 10:
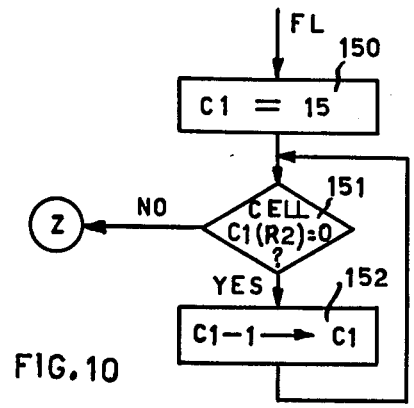

To this end, the code of the position FL (TABLE I) of the selector 44 addresses in the ROM 4 of administrative type a subroutine which precedes the printing subroutine 143 (FIG. 10) and comprises an operation 150 in which the addressing register C1 (FIG. 3) is loaded with the number 15 called in known manner from a location of the memory ROM 4, so that the cell 15 of the register R2 is addressed. An examination 151 of the cell of R2 addressed in this way is then effected and if this is at zero a decrementing of the register C1 is caused (operation 152) until a significant digit is found. In this case, the result of the examination 151 starts the printing subroutine 143 (FIG. 9). It is thus clear that the selector 43 is inhibited in this case precisely in order to obtain the maximum accuracy of the output results.

If, on the other hand, the operator introduces into the machine a ROM 4 containing microprograms adapted to solve scientific problems, the position "FL" of the selector 44 constitutes prearrangement of the keyboard, in addition to that of microprograms. To this end, the function keyboard 31 comprises a key EX40 which is generally depressed after the entry of a number which, for commanding printing, is stored in the register R2.

Figure 11:
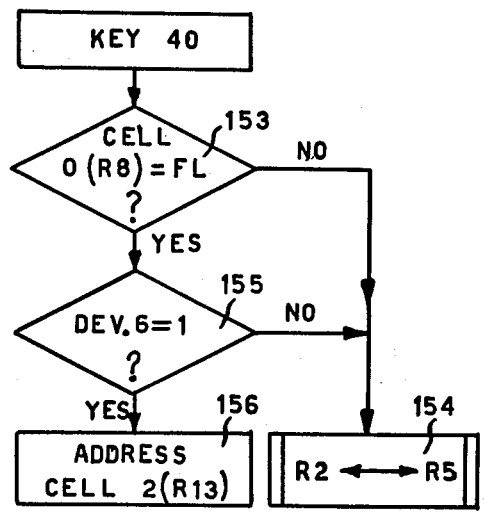

The actuated key 40 always commands an examination 153 (FIG. 11) of the cell 0 of the register R8, in which there is the code of the position FL of the selector 44, as seen hereinbefore. If the examination 153 gives a negative result, there is now effected in any case an operation of exchange 154 between the register R2 and the register R5 of the RAM 10 (FIG. 3), so that the name EX of the key assumes the significance of "Exchange". Moreover, the printing of the new contents of the register R2 is effected in accordance with the prearrangement of the selectors 43 and 44.

If, on the other hand, the examination 153 gives a positive result, there is now produced another examination 155 of a switching element DEV6 of the RAM 10 (FIG. 3), which is set at 1 only when a ROM 4 of scientific type is connected to the computer. If the examination 155 then gives a negative result, it likewise produces the operation of exchange 154, so that it is clear that in the absence of the position FL of the selector 44 the function of the key 40 is not affected by the type of ROM 4.

If, on the other hand, the examination 155 gives a positive result, an addressing of the cell 2 of the register R13 is produced, so that the possible digit entered after the key EX40 is stored in this cell and the possible following digit is stored in the cell 2 of the register R14, and so on, forming the exponent. The number entered before and stored in R2 is regarded as the fixed point part, so that it is clear that the position "FL" of the selector 44 prearranges the entry of the numbers in scientific notation and the name "EX" of the key 40 assumes the significance of "Exponent".

In this case, the numerical introduction of the fixed point part before the actuation of the key EX 40 generally takes place as a natural number. In this case, conversion of the datum into floating point is effected immediately, so that in the cells 2 of the registers R13, R14 and R15 there is then a certain exponent corresponding to the digits entered for the fixed point part. Moreover, by then entering the exponent to be applied to the natural number, after operation of the key EX 40, the digits which follow the key EX 40 are added by means of the accumulator 21 the exponent created by conversion as the exponent entered by the operator. If a number greater than 99 results from the addition between the exponent formed during the conversion and the exponent entered by the operator, the machine gives an error signal. Obviously, in the event of its actuation not being followed by any digit, the machine uses as exponent that deriving from the entry of the fixed point part.

If the key EX 40 is actuated a second time after the entry of the exponent, the exponent itself can be modified by introducing two new digits which the machine takes as effective, disregarding the previous ones.

In scientific notation, that is with the selector 44 positioned at FL and with a ROM4 for scientific calculations, it may happen that it is necessary to introduce a power of 10 without any coefficient: that is, the number to be introduced has a mantissa or fixed point part 1. In this case, the actuation alone of the key EX 40 (that is, without entering the fixed point part) produces the forcing into the keyboard buffer B15 of the value 1 as fixed point part. In this way, the operation of the machine is simplified, with a saving of time, which makes it accessible also to persons without any training in the field of automatic calculation.

If the actuation of the key EX 40 is not preceded by the introduction of digits, by means of a suitable routine the exchange between R2 and R5 is not performed, but the printing of the contents of R2 is produced, this being the case whatever the ROM 4 connected to the machine.

What I claim is:

1. An electronic computer having automatic decimal point setting means wherein a whole part and a decimal part of a numerical amount entered by the computer keyboard as a whole number can be automatically established, comprising:

a central processing means, having a memory, for processing data to calculate resulting data;

a numerical keyboard, comprising numerical keys, coupled to said memory for defining said numerical amount and causing the entry in said memory of data, representing said numerical amount, to be processed;

a decimal point key on said numerical keyboard for manually establishing a whole part and a decimal part of said numerical amount;

an input register in said memory having cells for storing said numerical amount to be processed;

an output register in said memory having cells for storing the resulting numerical amount representing said resulting data;

a printing unit coupled to said output register for printing the data contained in said output register;

a selector means for establishing a number of decimal positions of said resulting numerical amount;

said selector means comprising a settable element means selectively movable over a series of positions and movable to an additional position and a further position, each position of said series of positions corresponding to said number of decimal positions, for selecting a desired decimal position of said resulting numerical amount;

a decimal position register means in said central processing means for storing said desired decimal position, said central processing means further comprising a first addressing register for addressing cells of said output register according to the contents of said decimal position register means, wherein said printing unit responsive to said first addressing register prints said resulting numerical amount stored in said output register with the desired decimal position;

an additional position means, coupled to said settable element means, for generating a positioning signal in response to movement of said settable element means to said additional position; and an Add-Mode control means in said central processing means responsive to said positioning signal for causing said decimal position register means to store a predetermined fixed decimal position, said central processing means further comprising a second addressing register responsive to said decimal position register means for addressing cells of said input register according to said predetermined decimal position, whereby the whole part and the decimal part of said numerical amount entered by said numerical keyboard as a whole number is automatically established.

2. The electronic computer of claim 1, wherein said input register includes a mantissa register for storing data representing the mantissa of said numerical amount and an exponent register for storing data representing the exponent of said numerical amount;

incrementing means in said central processing means conditionable by said numerical keys, for incrementing by one said exponent register upon the entry of each digit in the mantissa of said numerical amount, disabling means responsive by the depression of said decimal point key for disabling said incrementing means upon depression of said decimal point key;

and subtracting means in said central processing means conditionable by said Add-Mode control means to subtract from the data stored in said exponent register the data stored in said decimal position register means to establish said whole part and said decimal part.

3. The electronic computer according to claim 1 wherein depression of the decimal point key generates an associated signal, said central processing means further comprising:
a comparison means for detecting the simultaneous presence of said associated signal and said positioning signal; and
a disabling means responsive to said comparison means for disabling said Add-Mode control means when said associated signal and said positioning signal are simultaneously detected.

4. A electronic computer according to claim 1 wherein said central processing means further comprises:
a comparison means coupled to said numerical keyboard for comparing a code of the position of the settable element means with a code of the number of digits entered on the keyboard after the decimal point,
and an incrementing means responsive to said comparison means for incrementing the addressing register if the number of decimal digits entered exceeds the number of decimal digits corresponding to the position of the settable element means, whereby said whole part and said decimal part of said numerical amount are printed including the digits entered on the keyboard after the decimal point.

5. An electronic computer according to 1, comprising a rounding-off device including a settable member adapted to be set in one of a series of round-off positions to select the type of rounding off desired for the resulting numerical amount, before the printing of a result to command the addition of a digit corresponding to the type of rounding-off desired in the cell of said output register addressed by said addressing register.

6. An electronic computer according to claim 5 comprising an accumulation register in said memory for accumulating amounts, wherein said member is also adapted to be set in a series of positions associated with said round-off positions, said rounding-off device further includes means to emit an additional signal for conditioning the accumulation of the printed result in the accumulation register of the memory.

7. An electronic computer according to claim 1, comprising a read-only memory coupled to said memory for storing microprograms permanently, a processing unit in said central processing means for executing said microprograms, and wherein said settable element means selects said predetermined fixed decimal positions by conditioning the calling of one of said microprograms from the read-only memory, said decimal point key causing a jump in said one microprogram to exclude the operation of said Add-Mode control means.

8. An electronic computer according to claim 7 wherein said memory of the central processing means has cells which receive said data to be processed, a circuit means coupled to said settable means for generating a corresponding electrical signal for each of said series of positions of said settable element means and conditioning a corresponding microprogram, containing microinstructions, for each of said series of positions of said settable element means, wherein said corresponding electrical signal is stored in said first addressing register in performance of first microinstruction of said microinstructions, and analyzing means conditionable by a second microinstruction of said microinstructions to analyze the contents of said addressing register.

9. An electronic computer according to claim 8, wherein depression of said decimal point key generates an associated signal;
said one microprogram containing first and second microinstructions;
said associated signal is stored in a predetermined cell of said cells of the memory of said central processing means in performance of said first microinstructions of said one microprogram, excluding means conditionable by said second microinstructions of said one microprogram to exclude the operation of said Add-Mode control means.

10. An electronic computer according to claim 9, wherein said read-only memory comprises an internal and external portion, said external portion being removable and interchangeable and belongs to either a first or second category, said further position of said settable element means addresses, if a first category is utilized, a first subroutine of said memory, and addresses, if said second category is utilized, a second subroutine of said memory.

11. An electronic computer according to claim 10, comprising an exchange key adapted to be conditioned by the settable element means in said further position as a function of the category of said external portion of said read-only memory.

12. An electronic computer according to claim 11, wherein in the said further position, the settable element means is conditioned by said first subroutine to produce the printing of all the decimals entered or resulting from a calculation.

13. An electronic computer according to claim 12, wherein in the presence of said first category said exchange key produces the exchange of the contents of a first register in said memory and the contents of a second register in said memory, while in the presence of a memory of said second category said second subroutine controls the entry of the data in said memory and the printing of said resulting numerical amount in accordance with scientific notation.

* * * * *